Figure 1:
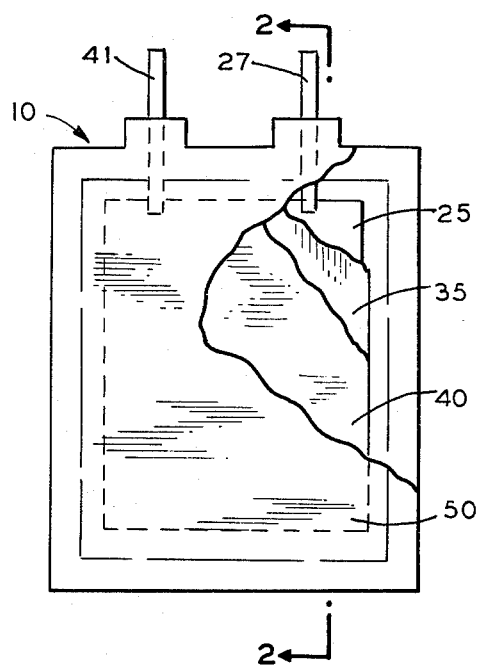

United States Patent [19]

Dey

[11] 3,998,658
[45] Dec. 21, 1976

[54] HIGH VOLTAGE ORGANIC ELECTROLYTE BATTERIES

[75] Inventor: Arabinda N. Dey, Needham, Mass.

[73] Assignee: P. R. Mallory & Co. Inc., Indianapolis, Ind.

[22] Filed: Jan. 31, 1975

[21] Appl. No.: 545,955

[52] U.S. Cl. .............................. 429/194; 429/218
[51] Int. Cl.² ....................................... H01M 43/00
[58] Field of Search ............ 136/6 LN, 6 R, 83 R, 136/100 R, 20, 137, 154

[56] References Cited
UNITED STATES PATENTS

| | | | |
|---|---|---|---|
| 3,043,896 | 7/1962 | Herbert et al. | 136/6 LN |
| 3,658,592 | 4/1972 | Dey | 136/6 LN |
| 3,853,627 | 12/1974 | Lehmann et al. | 136/83 R |
| 3,864,168 | 2/1975 | Casey, Jr. et al. | 136/6 LN |
| 3,871,915 | 3/1975 | Brych | 136/6 LN |

*Primary Examiner*—Anthony Skapars
*Attorney, Agent, or Firm*—Ronald S. Cornell; Israel Nissenbaum; Charles W. Hoffmann

[57] ABSTRACT

The solubility and reactivity of $CrO_3$ with the commonly used non-aqueous organic electrolytes used for high voltage electrochemical cells is overcome by forming an intercalation compound of $CrO_3$ with graphite. The cathodes of such intercalation compounds, methods of making same and cells containing such electrodes are described. In addition it has been found that cells containing such $CrO_3$ cathodes are readily rechargable and thus provide an excellent secondary battery.

5 Claims, 3 Drawing Figures

HIGH VOLTAGE ORGANIC ELECTROLYTE BATTERIES

FIELD OF THE INVENTION

This invention relates to primary and secondary non-aqueous electrolyte cells and more particularly it relates to cathode containing $CrO_3$ to be used for such cells.

BACKGROUND OF THE INVENTION

It has always been desirable to use the strongest possible oxidizing agents as cathodic depolarizers. Some of the strongest, such as $CrO_3$, however, cannot be used in the most efficient electrochemical systems, ie, those utilizing light active metals such as lithium, sodium, potassium, rubidium, calcium, barium, magnesium and aluminum as such active metals require non-aqueous electrolytes. Such active metals cannot be used with aqueous electrolytes as they are positioned above hydrogen in the electrochemical series and react chemically with aqueous electrolytes instead of electrochemically through the electrolyte. Consequently with such active metal anodes non-aqueous electrolytes are required. Most favored electrolyte systems are those wherein a salt of the anodic metal with highly mobile anions such as perchlorates, hexafluorophosphates, hexafluoroarsenates and tetrafluoroborates are predissolved in non-aqueous polar solvents. Among such solvents commonly used are tetrahydrofuran, propylene carbonate, isopropylamine, dimethoxy ethane, methyl formate, acetonitrile, dimethyl sulfoxide, N-nitrosodimethylamine, dimethyl sulfite, dimethyl formamide, γ-butyrolactone, diethylene glycol and mixtures thereof.

However, $CrO_3$ and the similar strong oxidizing agents cannot be used as depolarizers for such organic electrolyte electrochemical cells because of the high solubility and chemical reactivity of the depolarizers with the solvents. Until now the main direction for solving this problem has been directed toward finding a solvent/electrolyte system which was sufficiently inert to the depolarizer. However, generally those solvents sufficiently inert to the $CrO_3$ would not dissolve or ionize sufficient amounts of the electrolyte salts to provide an adequate electrolyte system.

THE INVENTION

It is thus an object of this invention to provide $CrO_3$ depolarized cathodes for use with organic electrolytes.

It is another object of this invention to provide non-aqueous electrolyte electrochemical cells utilizing highly active metal anodes and $CrO_3$ cathodes.

It is another object of this invention to provide a rechargable non-aqueous electrolyte electrochemical cell based upon the $Li/LiClO_4/CrO_3$ system. It is thus a primary object of this invention to provide high voltage and high energy density organic electrolyte primary and secondary electrochemical cells and a cathode active material useful in such cells and methods for fabrication of such cathode active material into cathodes and subsequently manufacturing cells therefrom.

I have discovered a method by which the solubility and the chemical reactivity of strong oxidizing agents such as $CrO_3$ can be greatly reduced so that the material can be used as depolarizing cathodic material for organic electrolyte cells and batteries. This was accomplished by preheating the $CrO_3$ with graphite at a temperature near the melting point of the $CrO_3$, viz 198° C. I have discovered that such a procedure renders the $CrO_3$ insoluble to solvents such as tetrahydrofuran without reducing its electrochemical activity. It is possible that $CrO_3$ forms interstitial compounds with graphite under the above conditions. Such interstitial compounds have been reported by R. C. Croft, Australian J. Chem. 9, 184–194 (1956). He has classified these curious chemicals as intercalation compounds. However, to the best of my knowledge such intercalation compounds of $CrO_3$ with graphite have never before been used as depolarizers for organic electrolyte batteries.

The intercalation compounds (called compounds for lack of more accurate characterization) can be formed by mixing $CrO_3$ and graphite in proportions from 10–1 to 1–3 parts by weight. These compounds are formed at temperatures in the range from 175°–225° C but generally it is preferred to heat the mixed powders at just below or about the melting point of $CrO_3$ (198° C). The heating can take place in air but is preferably accomplished in sealed tubes and should be continued for at least 3 hours but preferably for longer periods.

A test for the completion of the formation of the intercalation compound consists in the introduction of small portions of the heated mixture into tetrahydrofuran or water. The absence of leaching and thus coloration indicates the formation and segregation of all of the $CrO_3$ into the intercalation compound with the graphite.

The compounds after heating should be stored under anhydrous conditions as $CrO_3$ is hygroscopic but is less so in the form of the intercalation compound.

The intercalation compound is utilized to manufacture cathode active materials by being pressed into cathode form. The pressure may be directly applied to the powdered intercalation compound but it is preferred to use binders such as silicon or fluorocarbon polymers. A preferred binder is colloidal Teflon. It is admixed with the $CrO_3$-graphite intercalation compound in amounts ranging from 1–15 weight percent of solid Teflon to intercalation compound. The Teflon is available commercially (du Pont) in colloidal suspension form containing 10–60% Teflon solids.

The intercalation compound has been found to be sufficiently conductive to be used alone as the cathodic active material but additional graphite or powdered or subdivided inert conductive metals may be added where the cells are to be designed for high drain rate conditions. Powders, foils, chips, turnings or fine wires in chopped or mesh form of metals such as nickel or a properly inert stainless steel are useful for such high drain applications. The conductivity improvers may be admixed evenly throughout the body of the cathode active material or may be segregated to provide special high conductivity areas for special purpose cells.

It is also useful in constructing the cathodes of these intercalation compounds to provide the cathodes with a conductive current collector. This is usually in the form of a woven metallic mesh of a conductive metal inert to the cell components during the charged and discharge and recharge phases of cell operation. Woven or expanded metal meshes are preferred as current collectors. Nickel is the commonly preferred material for constructing of such current collectors. The terminal tabs may be fastened to the current collectors as by spot welding. The collector also serves to provide both rigidity and resilience to the cathode structure.

In preparing the cathodes the active material, in required amount with binders and further additives for improvement of conductivity and or electrolyte wetting, is filled into a suitably shaped mold containing therein the above described current collector of proper shape and size. The cathode material is sifted and tamped into the mold and pressure is applied. The pressure to be applied may range from about 500 psi which is sufficient to insure unifying of the electrode structure to above 30,000 psi. After pressing, the cathode electrodes are preferably baked to remove binder solvents and or Teflon suspending agents. These electrodes are preferably flat but may be in other shapes depending upon design considerations which are determined by ultimate application.

These cathodes are preferably used in conjunction with the active metals set forth above. However, as the intercalation compounds are sufficiently insoluble in some aqueous electrolytes, they may be used in conjunction with such electrolytes and less active anodic metals such as zinc or cadmium. A test for suitability of the intercalation compound with an electrolyte is the absence of the hexavalent chromium ion coloration (yellow-orange), when the intercalation compound is introduced into the electrolyte.

The cell aspects of this invention will be described in conjunction with lithium/organic electrolyte/$CrO_3$ intercalation compound cells.

Figure 2:
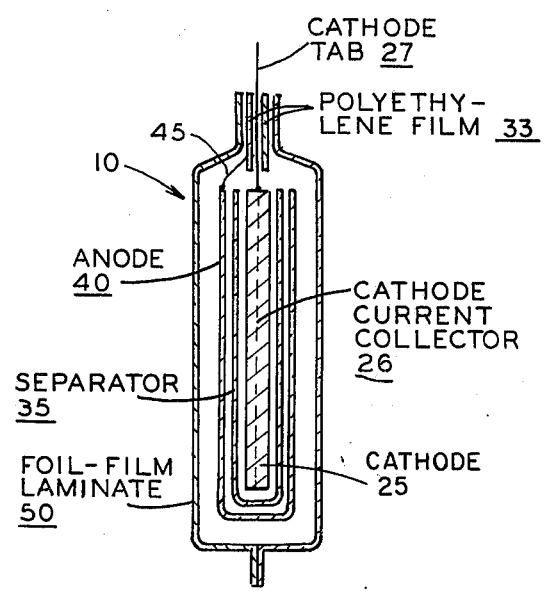

FIGS. 1 and 2 illustrate the construction of such exemplary cells. The cells 10 have parallel plate configuration utilizing lithium metal anodes 40 in ribbon form pressed on stainless steel current collector with leads 45 leading to anode tab 41. The anode 40 are placed on both sides of rectangular cathode 25 having a nickel expanded metal current collector 26 to which is spot welded cathode tab 27. The anode 40 and cathode 25 are separated by separator 35. The separator is fabricated from filter paper or any other absorbent material for the electrolyte. The cells are packaged in a foil film laminate bag 50 of aluminum foil laminated on both sides with polyethylene. The electrolyte is introduced into the cell package which is then heat sealed around the electrode tabs 41 and 27 by polyethylene film 33 to prevent leakage of the electrolyte.

Cells according to this invention have excellent shelf life showing good or improved performance after room temperature and elevated temperature storage when compared to freshly prepared cells.

In addition to discovering that the intercalation compounds provide an excellent cathode active material according to the invention for the cathodes of this invention in the novel cells described above, I have also discovered that this high voltage organic electrolyte system comprising lithium anodes and $CrO_3$/graphite intercalation compounds are capable of undergoing many charge-discharge cycles with excellent cycling efficiency to provide a rechargable high energy density organic electrolyte system.

The invention in its various aspects will be more fully described in conjunction with the appended examples which describe presently preferred modes of practice of these individual and related aspects of the invention. The examples are merely exemplary of these preferred modes and other art recognized equivalents of such materials and procedures are intended within the scope of this invention.

EXAMPLE 1

Powdered $CrO_3$ and graphite powder were mixed thoroughly in 2:1 weight ratio with a mortar and pestle. The mixture was contained in a porcelain crucible and heated in a tube furnace for 4 days at 195° C in air. At the end of 4 days, the furnace was cooled to room temperature and the above mixture was taken out of the furnace. A small sample of this material when poured either into water, or into tetrahydrofuran, gave no coloration of the liquid indicating the insolubility of the $CrO_3$ in the intercalation complex. Prior to the above heat treatment, the $CrO_3$ and graphite mixture produced instantaneous coloration of the hexavalent chromium ion (deep yellow-orange) when poured into either water or tetrahydrofuran.

EXAMPLE 2

The heat treated intercalation compound material of Example 1 was ground to a powder using a mortar and pestle. Cathodes were constructed without any further addition of graphite to the above powder (as it was found to be adequately conductive) using the following procedure:

The powder was admixed with an aqueous Teflon dispersion (commercially sold as colloidal Teflon) so that the amount of solid Teflon content was 5% by weight of the mix. This was then treated with isopropyl alcohol and mechanically kneaded to form a rubbery mass. This rubbery material was then dried under vacuum at room temperature and the solids were converted into a fluffy powder using a blender. Rectangular cathodes were molded on an expanded nickel current collector using the above powder by pressing with a force of 5000 lbs in a rectangular (2.27 cm × 0.95 cm) die. The apparent area of the finished cathodes was 2.16 cm². The cathodes were then further dried under vacuum for 2 hours at room temperature.

EXAMPLE 3

Li/$CrO_3$ graphite cells were constructed in a parallel plate configuration using two rectangular lithium anodes (lithium ribbon pressed on stainless steel) placed on both sides of the rectangular cathode prepared as in Example 2, using one layer of filter paper separator on each side. The cells were packaged in a foil laminate bag (aluminum foil laminated with polyethylene). The electrolyte, 1M $LiClO_4$ in an equivolume mixture of propylene carbonate and tetrahydrofuran electrolyte was introduced and the cells were heat sealed (see co-pending application Ser. No. 822,661 for details of packaging method). The cells were cathode limited.

Figure 3:
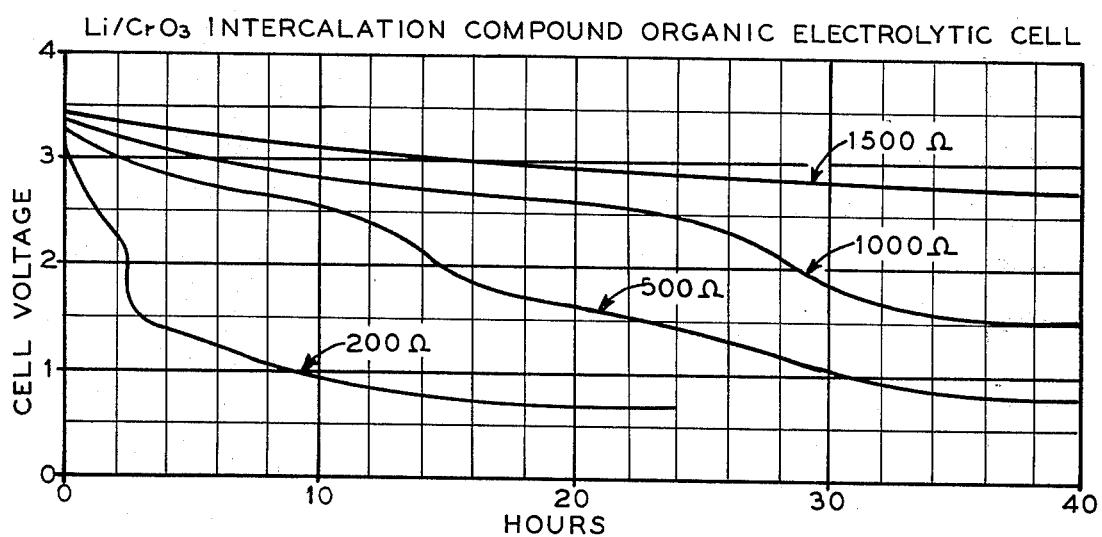

The open circuit voltage of the cells was 3.8 volts. The cells were discharged across constant loads of 200, 500, 1000 and 1500 ohms. The discharge characteristics of the cells under the above loads are shown in FIG. 3. The electrical performance of the cells was excellent.

Assuming a cell reaction of $2Li + CrO_3 \rightarrow CrO_2 + Li_2O$ the cathode efficiency, the average cell voltage, and cathode current density to a 2.0 volt cut off are given in Table 1.

Table 1

| Cathode Weight (gms) | Stoichimoetric Capacity (ma.hr) | Load (ohms) | Average Cell Voltage |
|---|---|---|---|
| 0.51 | 173 | 1500 | 2.8 |

Table 1-continued

| Average C-D (ma/cm²) | Capacity to 2.0 volt cut off (ma.hr) | | Cathode Efficiency % |
|---|---|---|---|
| 0.49 | 166 | 1000 | 2.8 |
| 0.49 | 166 | 500 | 2.7 |
| 0.53 | 180 | 200 | 2.5 |
| 0.43 | 109 | | 63 |
| 0.65 | 81 | | 49 |
| 1.26 | 79 | | 47 |
| 2.90 | 31 | | 17 |

The theoretical energy density of the cells from this data was calculated to be 809 Whr/lb. (with the open circuit voltage of 3.8 volts).

leaching of $CrO_3$ with tetrahydrofuran, indicating the completion of the intercalation reaction.

The cathodes (2.27 cm × 0.95 cm) were prepared in the fashion similar to that described in Example 2 and the $Li/CrO_3$ + graphite intercalation compound organic electrolyte cells were then assembled in the manner described in Example 3.

The cells were tested fresh and after storage of up to 3 months at 55° C and at room temperature by discharging them across resistive loads of approximately 500 ohms and 100 ohms corresponding to the cathode current densities of 1 ma/cm² and 0.5 ma/cm² respectively. The data are given in Table 2. The improved service after storage is apparently due to improved penetration of the electrolyte into the cathode body.

Table 2

Shelf Life Characteristics of the $Li/CrO_3$ + Graphite Intercalation Compound Organic Electrolyte Cells

| Cathode Composition $CrO_3$: Graphite Ratio | Resistive load (Ohms) | Fresh | Hours of Service to 2.0V Cutoff after Storage at R.T. for periods of | | |
|---|---|---|---|---|---|
| | | | 2 Wks. | 1 Month | 3 Months |
| 5:1 | 500 (1 ma/cm²) | 12.6 | — | 19.4 | 16.9 |
| 4:1 | " | 10.8 | — | 12.8 | 13.6 |
| 5:1 | 1000 (0.5 ma/cm²) | 56.0 | — | 56.8 | 55.9 |
| 4:1 | " | 23.5 | — | 47.8 | 32.6 |
| | | | Hours of Service to 2.0V Cutoff after Storage at 55° C for periods of | | |
| | | Fresh | 2 Wks. | 1 Month | 3 Months |
| 5:1 | 500 (1 ma/cm²) | 12.6 | 15.0 | 17.1 | 12.0 |
| 4:1 | " | 10.8 | 10.6 | 14.4 | 10.9 |
| 5:1 | 1000 (0.5 ma/cm²) | 56.0 | 48.0 | 51.4 | 42.3 |
| 4:1 | " | 23.5 | 50.3 | 44.4 | 42.3 |

EXAMPLE 4

Two samples of $CrO_3$ + graphite intercalation compounds were prepared with the ratios of $CrO_3$: graphite of 4:1 and 5:1 respectively, by mixing powdered $CrO_3$ and graphite in the above weight ratios and heating it in a sealed evacuated pyrex glass tube at 198° for 3 days. The samples were removed at the end of the reaction by breaking the glass tubes. The materials showed no The shelf life characteristics of the system is excellent.

EXAMPLE 5

One of the cells of Example 4 was subjected to repeated constant current charge-discharge cycles. The stoichiometric capacity (cathode) of the cell was 223 ma.hr, and the capacity recovered up to 1.0 volt cutoff, on the first discharge was 218 ma.hr. The subsequent cycling data including the current, the capacity and the cycling efficiency are given in Table 3.

Table 3

Charge-Discharge Cycling Characteristics of the $Li/CrO_3$-Graphite (5:1) Intercalation Compound Organic Electrolyte Cell

| Cycle No. | Charge/Discharge Current (ma) | Charging Capacity (ma.hr) | Discharge Capacity to 2.0V cutoff (ma.hr) | Cycling Efficiency (%) |
|---|---|---|---|---|
| 1 | 1 (0.25 ma/cm²) | 72.0 | 41.0 | 57 |
| 2 | " | 15.5 | 15.5 | 100 |
| 3 | " | 14.0 | 14.5 | 100 |
| 4 | " | 48.0 | 43.05 | 89 |
| 5 | " | 42.5 | 41.2 | 97 |
| 6 | " | 35.6 | 35.5 | 100 |
| 7 | " | 37.5 | 36.0 | 96 |
| 8 | " | 36.0 | 36.0 | 100 |
| 9 | " | 37.0 | 37.0 | 100 |
| 10 | " | 37.0 | 34.4 | 93 |
| 11 | " | 33.0 | 27.0 | 82 |
| 12 | 2 (0.5 ma/cm²) | 17.6 | 17.4 | 99 |
| 13 | " | 70.0 | 66.0 | 94 |
| 14 | 4 (1 ma/cm²) | 40.0 | 30.0 | 75 |
| 15 | " | 54.0 | 50.0 | 93 |
| 16 | " | 50.8 | 48.0 | 94 |
| 17 | " | 45.6 | 44.8 | 98 |
| 18 | " | 52.0 | 52.0 | 100 |
| 19 | " | 52.0 | 52.0 | 100 |
| 20 | " | 51.0 | 51.0 | 100 |

Table 3-continued

Charge-Discharge Cycling Characteristics of the Li/CrO₃-Graphite (5:1) Intercalation Compound Organic Electrolyte Cell

| Cycle No. | Charge/Discharge Current (ma) | Charging Capacity (ma.hr) | Discharge Capacity to 2.0V cutoff (ma.hr) | Cycling Efficiency (%) |
| --- | --- | --- | --- | --- |
| 21 | " | 48.8 | 48.4 | 99 |
| 22 | " | 8.0 | 11.2 | 140 |
| 23 | " | 47.2 | 44.0 | 93 |
| 24 | " | 42.8 | 40.0 | 93 |
| 25 | " | 39.2 | 38.0 | 97 |
| 26 | " | 37.2 | 36.4 | 93 |
| 27 | " | 34.8 | 30.8 | 88 |
| 28 | " | 30.8 | 26.0 | 84 |

The average depth of discharge was 25% and the average cycling efficiency was close to 90%. The cumulative total capacity recovered from the cell was 1200 ma.hr (approx.). This is five times the initial stoichiometric cathode capacity. Examination of the cell after the final discharge (cycle 28) showed the complete exhausting of the lithium anode, but no deformation or deterioration of the cathode. The cell was then reassembled with a new anode and the same cathode showed regained cyclability, although the cell impedance was slightly higher than before. The data indicate that the system is eminently rechargeable. There is also evidence to indicate that the recharging characteristics of the Li anode is improved due to the presence of trace amounts of chromate ions. The cumulative capacity of 1200 ma.hr approximately corresponds to twice the initial stoichiometric capacity of the Li anode. This is significantly greater than that generally obtained in the absence of the CrO₃ + graphite cathode.

What is claimed is:

1. A non-aqueous electrolyte electrochemical cell essentially consisting of an active metal anode juxtaposed with and separated by separator means from a depolarizer containing a cathode active composition;
said separator means including a non-aqueous electrolyte absorbed therein;
said cathode active composition consisting of the intercalation compound of $CrO_3$ and graphite.

2. The cell according to claim 1, wherein
said anode metal is selected from the group of electrochemically active metals above hydrogen in the EMF series consisting of Li, Na, K, Ca, Ba, Be, Al and Mg.

3. The cell according to claim 2, wherein
said electrolyte comprises a solution of an ionizable salt in an organic polar solvent selected from the group consisting of tetrahydrofuran, propylene carbonate, isopropylamine, dimethoxy ethane, methyl formate, acetonitrile, dimethyl sulfoxide, N-nitrosodimethylamine, dimethyl sulfite, dimethyl formamide, γ-butyrolactone, diethylene glycol and mixtures thereof.

4. The cell according to claim 3, wherein
said ionizable salt is selected from the group consisting of the perchlorates, hexafluorophosphates, hexafluoroarsenates, and tetrafluoroborates of the anode active metals.

5. The cell according to claim 3, wherein
said active metal is lithium.

* * * * *